US011239990B2

(12) United States Patent
Fiore et al.

(10) Patent No.: US 11,239,990 B2
(45) Date of Patent: Feb. 1, 2022

(54) PHASE ERROR DETERMINATION USING TWO MODULATORS

(71) Applicant: Infineon Technologies AG, Neubiberg (DE)

(72) Inventors: Vincenzo Fiore, Linz (AT); Werner Arriola, Linz (AT); Oliver Lang, Linz (AT); Alexander Melzer, Neutillmitsch (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/891,445

(22) Filed: Jun. 3, 2020

(65) Prior Publication Data

US 2020/0396049 A1 Dec. 17, 2020

Related U.S. Application Data

(60) Provisional application No. 62/860,410, filed on Jun. 12, 2019.

(51) Int. Cl.
  *H04L 7/00* (2006.01)

(52) U.S. Cl.
  CPC .......... *H04L 7/0054* (2013.01); *H04L 7/0016* (2013.01)

(58) Field of Classification Search
  CPC ... H04L 7/0054; H04L 7/0016; H04L 27/368; H04L 7/0338; H04L 2027/0067; G01S 13/931; H04B 7/0617; H04B 1/0475; H04B 7/01; H03M 1/0836
  See application file for complete search history.

(56) References Cited

U.S. PATENT DOCUMENTS

| | | | | | |
|---|---|---|---|---|---|
| 3,197,707 | A | * | 7/1965 | Wiltshire | H03D 9/04 455/214 |
| 3,234,547 | A | * | 2/1966 | Katzin | G01S 7/025 342/91 |
| 3,537,793 | A | * | 11/1970 | Shaffer, Jr. | G01P 3/36 356/28 |
| 5,434,887 | A | * | 7/1995 | Osaka | H03C 3/0908 331/46 |
| 5,784,412 | A | * | 7/1998 | Ichihara | H04L 27/2071 375/302 |
| 6,369,666 | B1 | * | 4/2002 | Simon | H03C 3/40 332/100 |
| 6,415,002 | B1 | * | 7/2002 | Edwards | H03C 3/0975 332/103 |
| 6,631,254 | B1 | * | 10/2003 | Wilson | H03C 5/00 375/295 |

(Continued)

*Primary Examiner* — Jean B Corrielus
(74) *Attorney, Agent, or Firm* — Eschweiler & Potashnik, LLC

(57) ABSTRACT

Noise test systems, methods, and circuitries are provided for determining a phase error of a first modulator using a second modulator. In one example, an integrated circuit device includes a first modulator configured to modulate a first signal to generate a first modulated signal and a second modulator configured to modulate a second signal to generate a second modulated signal. The first signal and the second signal are based on the same reference signal. The integrated circuit device also includes analysis circuitry configured to determine a phase error of the first modulator based on the first modulated signal and the second modulated signal.

20 Claims, 5 Drawing Sheets

(56) References Cited

U.S. PATENT DOCUMENTS

| | | | | |
|---|---|---|---|---|
| 8,160,178 B2* | 4/2012 | Toyota | ................ | H03D 7/1458 |
| | | | | 375/308 |
| 10,382,246 B2* | 8/2019 | Lee | ...................... | H04L 27/362 |
| 2009/0192738 A1* | 7/2009 | Nentwig | ............ | G01R 31/3163 |
| | | | | 702/66 |
| 2018/0302178 A1* | 10/2018 | Lloyd | ................ | H04B 17/0085 |

* cited by examiner

PHASE ERROR DETERMINATION USING TWO MODULATORS

CROSS REFERENCE TO RELATED APPLICATION

This application claims benefit of provisional of U.S. application No. 62/860,410 filed on Jun. 12, 2019, the contents of which are incorporated by reference in their entirety.

BACKGROUND

Many automotive sensors employ radar systems for detecting distance and speed. These radar systems often include multiple antennas for sending and/or receiving radar signals.

DESCRIPTION

Figure 1:
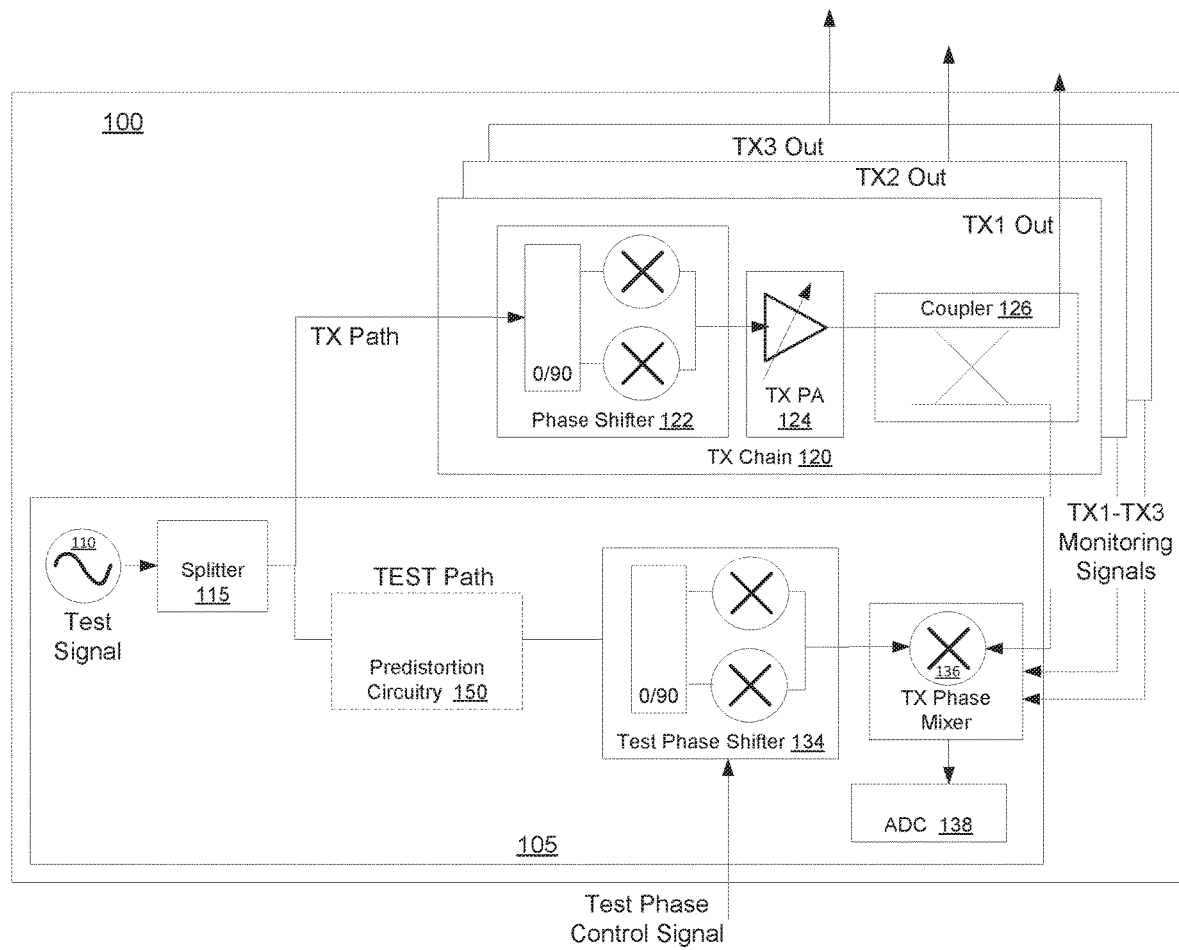
FIG. 1 illustrates an exemplary transmitter that includes a phase calibration system.

Referring to FIG. 1, a frequency-modulated continuous wave (FCMW) transceiver 100 is illustrated that includes multiple transmit (TX) chains that each generate a TX Out signal provided to a different TX antenna. A single TX chain 120 is illustrated in some detail in FIG. 1. While the other TX chains are not illustrated in detail, it is to be understood that the other TX chains include similar components to those shown in TX chain 120. Further, while three TX chains are illustrated, other numbers of TX chains may be included in the transceiver. The TX chain 120 includes a phase shifter 122 that is controlled to shift the phase of the TX Out signal for example to enable beamforming. Each of the TX chains may shift the phase of concurrent TX Out signals (e.g., TX1 Out-TX3 Out) by different amounts to "steer" the combined transmitted signal to a given receiver. A TX power amplifier (PA) 124 amplifies the TX1 Out signal to a power level appropriate for over the air transmission by the TX1 antenna (not shown).

In FCMW radar systems the number of TX and receive (RX) antennas determines the angular resolution of the beamforming algorithm. Therefore, a large number of TX and RX antennas is desirable to support more precise angular resolution. For optimal beamforming performance, the TX antenna signals in the different TX chains should be synchronized to avoid unwanted effects in the output of the beamforming algorithm. While TX chain phase synchronization is important for correct radar sensing, phase synchronization is difficult to achieve in high frequency radar systems (e.g., automotive radar operating at 77 GHz).

A phase calibration system 105 is provided that synchronizes the phase of the TX chains by comparing the phase of the different TX chains and controlling the phase shifter in each TX chain to make compensatory adjustments to the respective TX Out signal. The phase calibration system 105 includes a test signal generator 110 that generates a test or reference signal (e.g., a CW signal) and a splitter 115 that splits the test signal for input to a TX path and a TEST path. In each TX chain a coupler (e.g., 126 for TX chain 120) couples the test signal, as processed by the TX chain, and feeds the test signal to the RF port of a TX phase mixer 136. The feedback signals for the TX chains are labeled "TX1-TX3 Monitoring Signals" in FIG. 1. The LO input of the TX phase mixer 136 is fed with the test signal, whose phase is rotated by a unique test phase shift $\Delta\varphi$. The phase shift in the test signal is produced by a test phase shifter 134 which receives a test phase control signal to cause the test phase shifter 134 to rotate the phase of the test signal.

The resulting down-converted intermediate frequency (IF) signal generated by the TX phase mixer 136 is a DC level signal, which is converted to a digital signal with a sensor analog-to-digital converter (ADC) 138. The DC value sampled by the ADC depends on the phase difference between the signal in the TX path and the test signal which is used for down-conversion. This measurement is repeated for several values of test signal phase shift $\Delta\varphi$ between 0 and $2\pi$. The DC values, when plotted, follow a cosine. The phase of this cosine corresponds to the phase difference between the TX monitoring signal in the TX path and the test signal in the TEST path at an LO port of the TX phase mixer 136, which is used for down-conversion by the TX phase mixer. Thus the phase of the cosine indicates a phase shift induced by the TX chain. The phase difference measurement is repeated for each TX chain to determine a phase shift induced by each TX chain with respect to the LO port of the TX phase mixer 136. The phase shifter in each TX chain is adjusted to synchronize the relative phase of the TX chains.

Non-idealities in the phase calibration system 105 decrease the achievable accuracy of the phase calibration. One significant source of error is non-idealities of the test phase shifter 134. The test phase shifter 134 produces errors in phase and magnitude at its output. The magnitude errors can be neglected when the TX phase mixer 136 is operated in saturation (which is usually true). This is because the magnitude variations, as long as the variations are not severe, will not affect the output of the TX phase mixer 136 when it is being operated in saturation. Hence, in most instances only phase errors introduced by the test phase shifter 134 degrade the phase calibration process. If the phase error introduced by the test phase shifter 134 could be determined, pre-distortion circuitry 150 (or other compensatory measures not shown) could be used to compensate for the test phase shifter 134 phase error during phase calibration and thereby improve the phase calibration process.

Described herein are systems, circuitries, and methods that determine the phase error of a first modulator (e.g., a test IQ phase shifter or mixer) by using a second modulator (e.g., an LO phase shifter or mixer). The same test signal is provided to both modulators and the resulting first modulated signal and second modulated signal are combined to generate a phase error that includes phase error contributions of the first modulator as well as the second modulator. The phase error contribution of the second modulator is estimated and removed from the phase error to determine the "first modulator phase error" which is an estimate of the contribution of the first modulator (test phase shifter) to the measured phase error.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

Use of the word example is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

Figure 2:
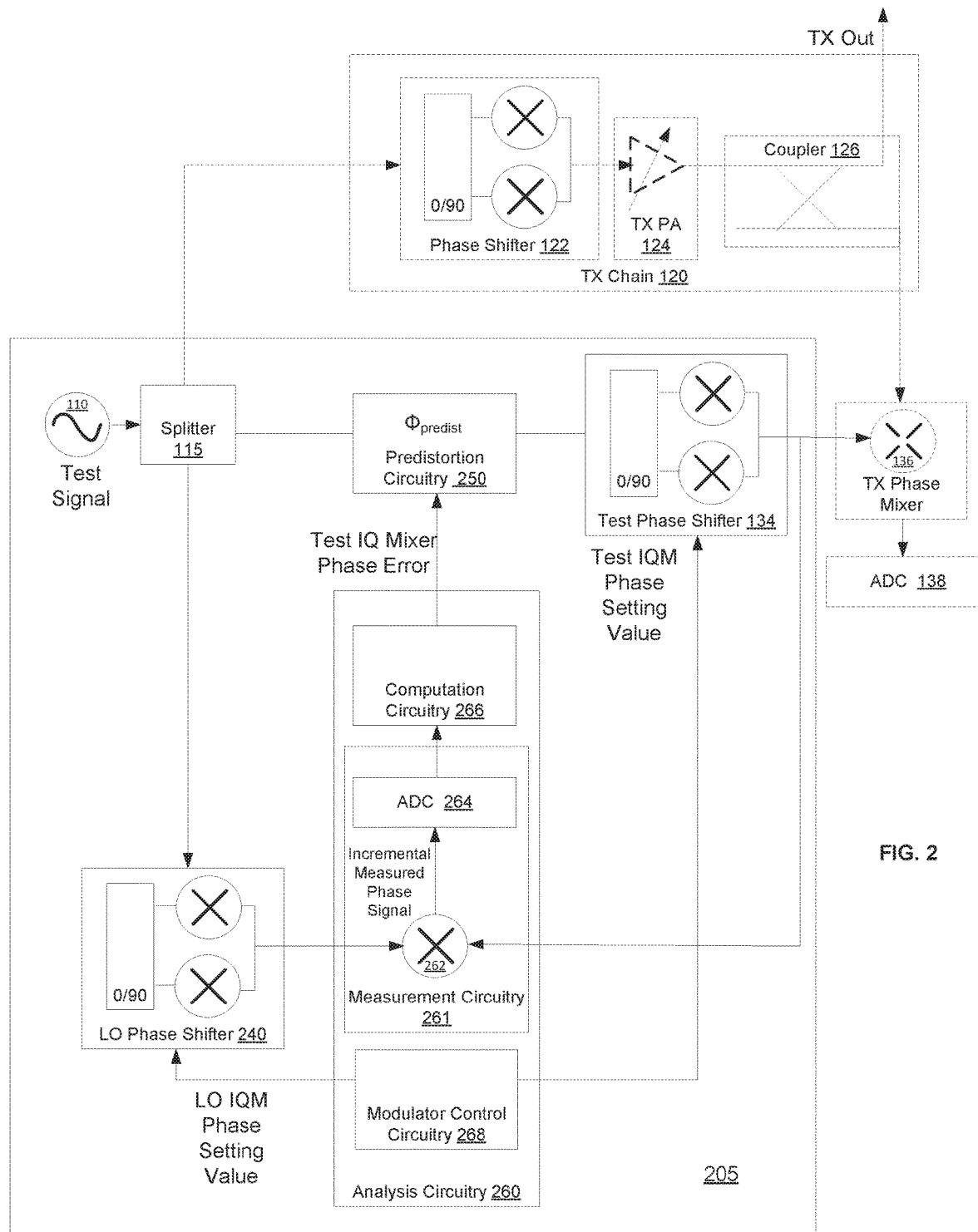
FIG. 2 illustrates an exemplary transmitter that includes a modulator phase error compensation system in accordance with various aspects described.

FIG. 2 illustrates an exemplary modulator phase error compensation system 205 that can be used to compensate for phase errors introduced by the test phase shifter 134 during TX chain phase calibration. The system 205 includes pre-distortion circuitry 250 configured to pre-distort the test signal that is input to the test phase shifter 134 based on an estimated phase error of the test phase shifter 134. Analysis circuitry 260 determines the (estimated) test phase shifter phase error.

To determine the phase error of the test phase shifter 134, the test signal is provided to the test phase shifter 134 and an LO phase shifter 240. In some contexts the test phase shifter 134 and the LO phase shifter 240 are referred to more generally as "modulators". Further, while the described systems, methods, and circuitries are configured to determine the phase error of the test phase shifter using the LO phase shifter, the described systems, methods, and circuitries are equally applicable to determine the phase error of any first modulator using a second modulator by modulating the same test (or common reference) signal with both modulators.

The analysis circuitry 260 includes measurement circuitry 261 that includes a mixer 262 to combine the modulated signal output by the test phase shifter 134 and the modulated signal output by the LO phase shifter 240 to generate an incremental measured phase signal. The incremental measured phase signal output is sensed by an ADC 264 and corresponds to a difference between the modulated signal generated by the test phase shifter 134 and the modulated signal generated by the LO phase shifter 240. It can be seen that the measurement circuitry 261 has the same role as the test phase shifter 134 and the TX phase mixer 136 during TX chain phase calibration described in FIG. 1 while the test phase shifter now becomes the device under test (DUT).

In one example, the mixer 262 is a down-conversion mixer associated with an RX chain of the transceiver and the ADC 264 is also associated with the RX chain. While the LO phase shifter 240 is used in system 205, a different mixer or modulator may be used in other examples. It may be beneficial to use a measurement circuitry and second mixer or modulator "on-chip" with the mixer or modulator under test because it can then be assumed that then the components would be subject to the same process-related non-idealities as well as similar temperature and power fluctuations during operation, simplifying the process of determining the phase error contribution of the test phase shifter to the measured phase signal.

The analysis circuitry 260 includes modulator control circuitry 268 configured to control the phase setting of the test phase shifter 134 and the LO phase shifter 240. The modulator control circuitry adjusts the phase settings of the test phase shifter 134 and the LO phase shifter 240 over a range of relevant phase values (e.g., all phase settings which are settable by the test phase shifter 134). The measurement circuitry 261 generates a measured phase signal (e.g., a set of measured phase values where each phase value corresponds to one phase setting) indicative of the phase of the test phase shifter 134 relative to the LO phase shifter 240. This measured phase signal is provided to a computation circuitry 266 by way of sensing/storing the measured phase signal in the ADC 264, which can be read by computation circuitry 266. The computation circuitry 266 determines the test phase shifter phase error based on the measured phase signal.

Figure 3:
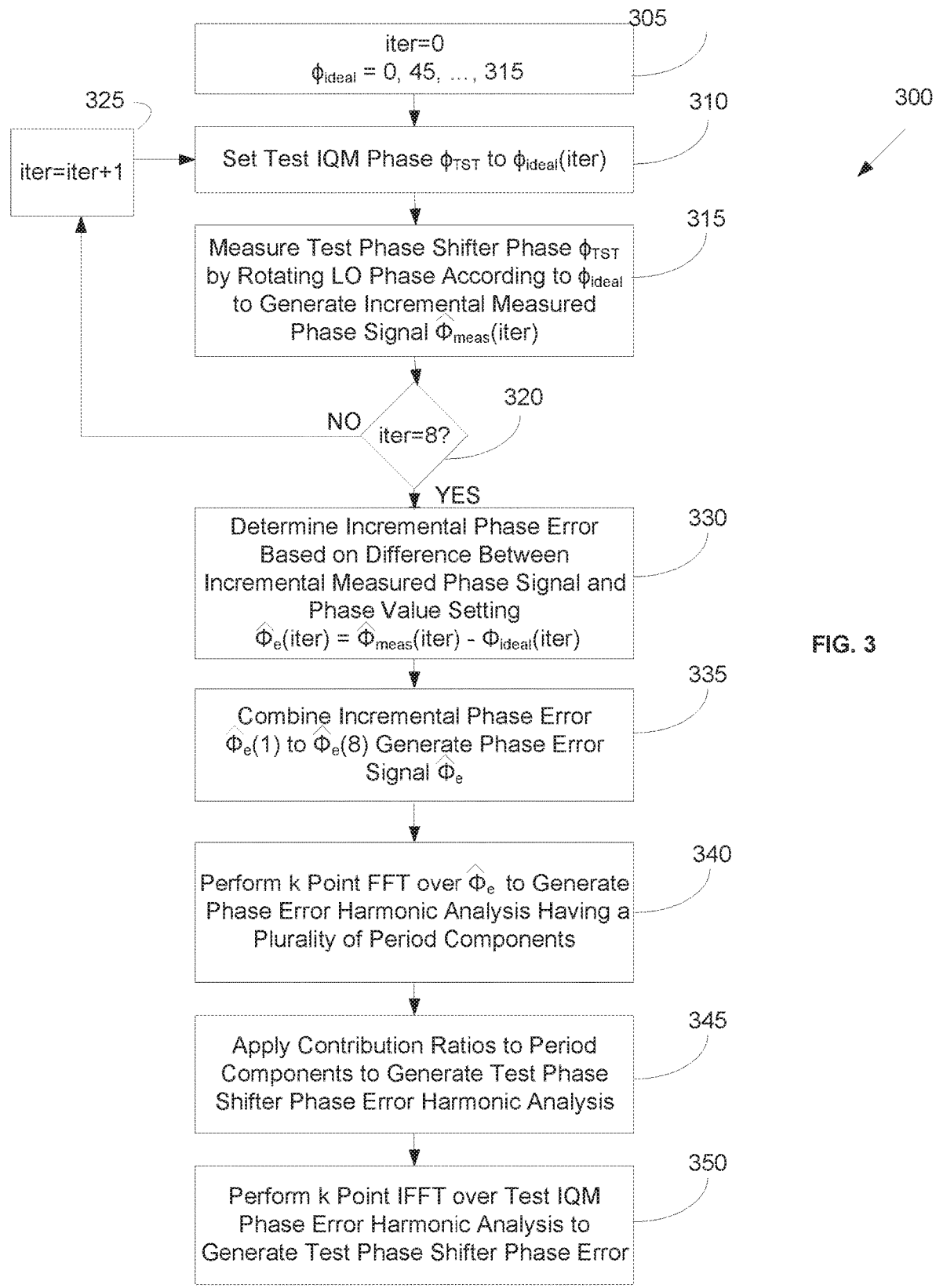
FIG. 3 illustrates a flow diagram of an exemplary method of determining a phase error in a phase shifter or modulator in accordance with various aspects described.

FIG. 3 illustrates a flow diagram outlining a method 330 that may be performed by the analysis circuitry 260 to determine the phase error of the test phase shifter 134. At 305, the process is initiated and a number n phase setting values $\phi_{ideal}$ are determined. In the illustrated example n is 8 and the phase setting values correspond to the range between 0 and 360 degrees taken in 45 degree increments. In other examples, different numbers of increments are used and the entire range of 360 may not be covered. At 310, the phase of the test phase shifter 134 is set to the first phase setting value. At 315, the phase of the modulated test signal output is measured by rotating the phase setting value of the LO phase shifter 240 through several phase setting values (e.g., from 0 to 360 degrees). This generates an incremental measured phase signal for the particular phase setting value, which is input to the computation circuitry 266 (e.g., by way of the ADC 264). In the illustrated example, the phase setting value of the LO phase shifter is rotated through all n of the phase setting values $\phi_{ideal}$ for the test phase shifter. In other examples, the phase setting value of the LO phase shifter 240 is rotated through m different phase setting values which may or may not cover an entire 360 degree range. At 320 a determination is made as to whether all of the phase setting values have been used. If not, at 325-315 an incremental measured phase signal is generated for the next phase setting value.

Figure 4:
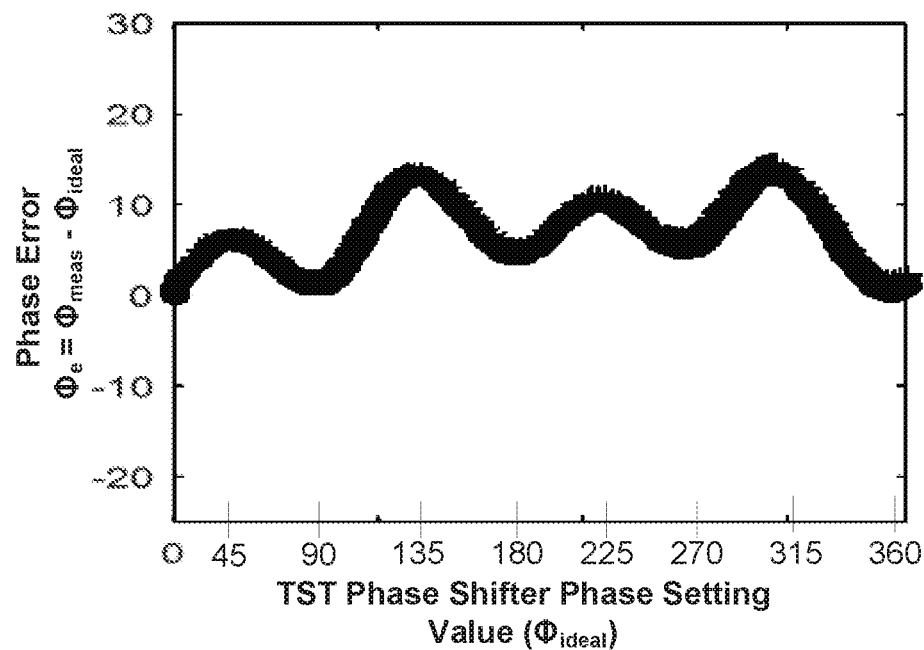
FIG. 4 illustrates a plot depicting an exemplary phase error.

At 330, after all phase setting values have been used to measure the test phase shifter phase, an incremental phase error is determined for each phase setting value as the difference between the incremental measured phase signal and the phase setting value itself. At 335, the incremental phase errors are combined to generate an "overall" phase error. FIG. 4 illustrates a plot of an exemplary phase error determined based on phase error measurements made at 8 phase setting values. This phase error includes contributions from the non-idealities of the test phase shifter 134 and the measurement circuitry 261 (i.e., LO phase shifter 240 and the mixer 262). It is assumed that the non-idealities of the LO phase shifter 240 dominate the non-idealities of the measurement circuitry. While a single phase error is illustrated in FIG. 4, in one example, a phase error is determined as just described for multiple temperatures so that temperature affects can also be compensated for during TX chain calibration.

Figure 5:
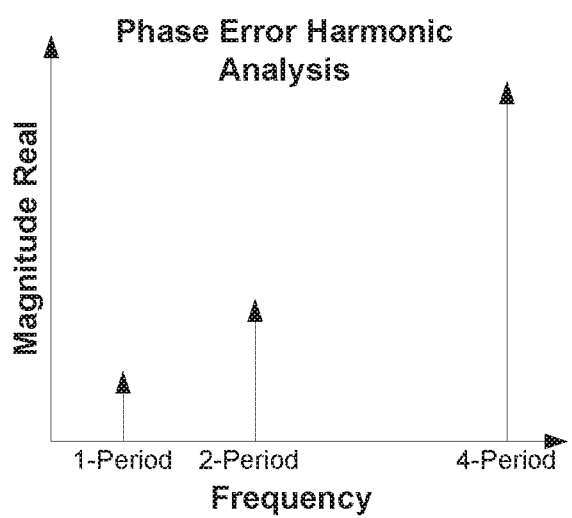
FIG. 5 illustrates a plot depicting an FFT of the phase error of FIG. 4.

Referring back to FIG. 3, in one example, an estimated phase error contribution of the LO phase shifter 240 is removed from the phase error as follows. At 340, the computation circuitry 266 performs a k point Fast Fourier Transform (FFT) over the phase error to generate a phase error harmonic analysis. FIG. 5 illustrates an exemplary phase error harmonic analysis having period components as labeled. Each period component corresponds to a harmonic component of the phase error signal at a harmonic defined by its relationship to the period of the phase error. For example, the 1-period component corresponds to the component of the phase error which can be described as a cosine which is a function of the phase error (i.e., the phase error component repeating after 360 degrees rotation). The 2-period component corresponds to the component of the phase error which can be described by a cosine with two periods with respect to the phase error signal (i.e., the phase error component repeating after 180 degrees phase rotation). In general, the n-period component corresponds to the phase error component n times the frequency of the phase error signal (i.e., the phase error component repeating after 360/n degree phase rotation). The most dominating components of the phase error harmonic analysis are the constant component as well as the 1-period, 2-period, and 3-period components.

Returning to FIG. 3, at 345, a contribution ratio is applied to each period component to reduce the phase error harmonic analysis to generate a test phase shifter phase error harmonic analysis that reflects only the estimated phase error of the test phase shifter. In one example, the contribution ratio for each period component is determined as follows. In the illustrated example, the constant component is neglected since a constant phase error of the test phase shifter does not affect the TX-to-TX phase calibration because it will be subtracted by the differential calibration algorithm. The 1-period and 4-period components of the LO phase shifter do not affect the phase error and as such the 1-period and 4-period components can be considered as being entirely the result of the test phase shifter. Thus a contribution ratio of 1.0 is applied to these components at 345.

The 2-period component includes contributions of both the test phase shifter and the measurement circuitry. Because both the test phase shifter and the LO phase shifter are expected to have the same temperature and input power, the contribution of the test phase shifter to the 2-period component is assigned as being equal to the 2-period component due to the measurement circuitry. Thus at 345 contribution ratio of 0.5 is applied to the 2-period component. Note that there may be conjugate 2-period component in the case of a double-sided FFT which will also be subject to the contribution ratio of 0.5. While a particular technique for determining a contribution ratio is described, any number of different contribution ratios may be applied to the period components.

At 350, a k point Inverse FFT is performed over the test phase shifter phase error harmonic analysis (e.g., FFT) to generate the test phase shifter phase error.

Figure 6:
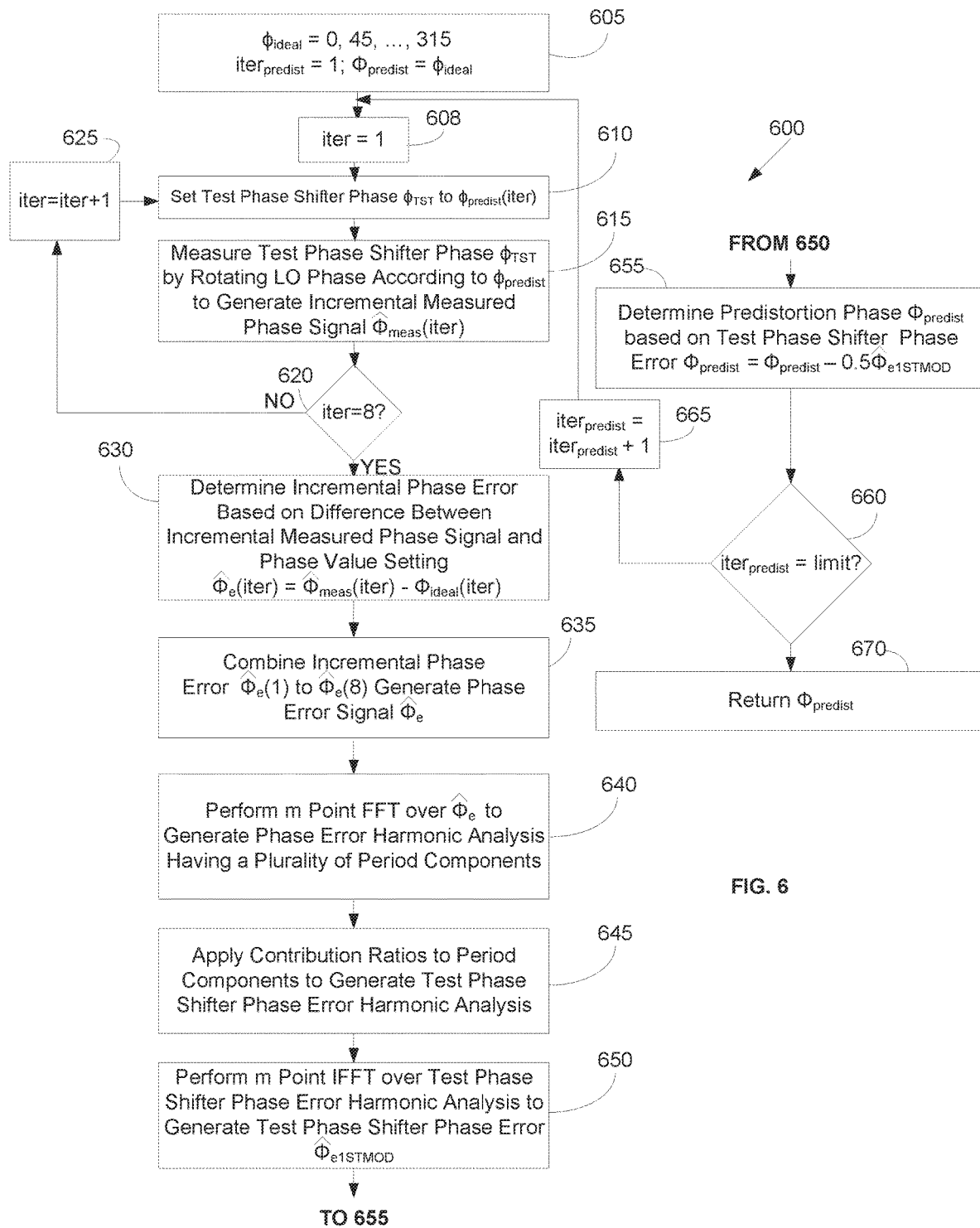
FIG. 6 illustrates a flow diagram of an exemplary method of determining a pre-distortion phase in accordance with various aspects described.

FIG. 6 illustrates a flow diagram of an exemplary method 600 that adds an additional loop that iteratively determines a pre-distortion phase to the method 500 of FIG. 5. The pre-distortion phase $\phi_{predist}$ can be applied by the pre-distortion circuitry to the test signal input to the test phase shifter 134 during TX chain calibration as described with reference to FIG. 1 to minimize the errors introduced by test phase shifter 134 during calibration and/or monitoring. The functions outlined in 605-650 determine a first modulator (e.g., test phase shifter) phase error in a manner similar to their counterparts 505-550 in FIG. 5 and will not be described again. In general, the method 600 adds a loop that gradually increases the pre-distortion phase applied by pre-distortion circuitry 250 (FIG. 2) to the common reference signal that is provided to the first modulator. The loop uses incremental phase error estimation functions of operations 608-650 to re-calculate the first modulator phase error that remains after each adjustment of the pre-distortion phase.

At 605, the pre-distortion iteration counter is set to 1 and an initial pre-distortion phase is set to the ideal phase (i.e., 0, 45, . . . , 315). At 608 the iteration counter for the incremental phase error estimation loop is set to one. Then, after 610-650 have been performed to determine a test phase shifter phase error, at 655, a new pre-distortion phase is determined by subtracting the new test phase shifter phase error $\varphi_{e1STMOD}$ reduced by some constant ratio $\alpha$ (0.5 in FIG. 6) from the current value of the pre-distortion phase vectors. At 660 a determination is made as to whether a predetermined limit on the number of pre-distortion phase determinations has been met. If not, the pre-distortion iteration counter is incremented and a new first modulator phase error is determined. If the predetermined limit on the number of pre-distortion phase determinations has been met, at 670 the pre-distortion phase is returned for use by pre-distortion circuitry 250.

A predetermined number of iterations of the predistortion loop is used as a termination criteria for the example method of 600. However, in other examples, different criteria, such as the new test phase shifter phase error $\varphi_{e1STMOD}$ being below a certain limit, may be used to terminate the method.

In a different example, the described techniques can be subsequently applied between the test phase shifter and the TX IQ mixer. Then the TX phase shifter takes the role of the device under test while the test phase shifter (without pre-distortion) takes the role of the measurement device. Assuming that the non-idealities producing the 2-period phase error components are sufficiently similar over the whole range of operating conditions, TX phase calibration can be performed.

In a different example, the described techniques can be subsequently applied between the test phase shifter and the TX IQ mixer. Then the TX IQ mixer takes the role of the device under test while the test phase shifter (after pre-distortion according to FIG. 2) takes the role of measurement device. Assuming that the test phase shifter non-idealities are sufficiently compensated by the pre-distortion performed by circuitry 250 in FIG. 2, the TX phase calibration can be performed in a single iteration.

It can be seen from the foregoing description that the systems, methods, and circuitries described herein increase the accuracy of TX phase calibration by estimating the phase error of the test phase shifter so that this error contribution may be compensated during TX chain calibration.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for determining phase errors of a modulator according to embodiments and examples described herein.

Example 1 is an integrated circuit device including a first modulator, a second modulator, and an analysis circuitry. The first modulator is configured to modulate a first signal to generate a first modulated signal. The second modulator is configured to modulate a second signal to generate a second modulated signal. The first signal and the second signal are based on a common reference signal. The analysis circuitry is configured to determine a first modulator phase error based on the first modulated signal and the second modulated signal.

Example 2 includes the subject matter of example 1, including or omitting optional elements, wherein the analysis circuitry includes measurement circuitry including a mixer configured to combine the first modulated signal and the second modulated signal to generate a measured phase signal.

Example 3 includes the subject matter of example 2, including or omitting optional elements, wherein the measurement circuitry includes a down-conversion mixer and an analog-to-digital converter associated with a receive chain.

Example 4 includes the subject matter of example 1, including or omitting optional elements, wherein the reference signal includes a continuous wave test signal.

Example 5 includes the subject matter of example 1, including or omitting optional elements, wherein the analysis circuitry includes modulator control circuitry configured to set the phase of the first modulator to n different phase setting values while, for each of the n values setting the phase of the second modulator to m different phase setting values. the analysis circuitry includes computation circuitry configured to, for each of the n phase setting values: determine a measured phase of the first modulator signal by combining the first modulated signal with the second modulated signal; and determine an nth incremental phase error as a difference between the measured phase and the nth phase setting value; combine the n incremental phase errors to generate a phase error; and reduce the phase error based on an estimated phase error contribution of the second modulator to determine the first modulator phase error.

Example 6 includes the subject matter of example 5, including or omitting optional elements, wherein the computation circuitry is configured to: perform a k point Fast Fourier Transform on the phase error to generate a phase error phase error harmonic analysis; determine a period component of the phase error phase error harmonic analysis; apply a contribution ratio to the period component to generate a first modulator phase error phase error harmonic analysis; and perform a k point Inverse Fast Fourier Transform on the first modulator phase error phase error harmonic analysis to generate the first modulator phase error.

Example 7 includes the subject matter of example 6, including or omitting optional elements, wherein the computation circuitry is configured to generate the first modulator phase error harmonic analysis by: determining a 1-period component of the phase error harmonic analysis; applying a 1-period contribution ratio of approximately 1.0 to the 1-period component; determining a 2-period component of the phase error harmonic analysis; applying a 2-period contribution ratio of approximately 0.5 to the 2-period component; determining a 4-period component of the phase error harmonic analysis; and applying a 4-period contribution ratio of approximately 1.0 to the 4-period component.

Example 8 includes the subject matter of example 1, including or omitting optional elements, further including pre-distortion circuitry configured to pre-distort the common reference signal provided to the first modulator based on the first modulator phase error.

Example 9 includes the subject matter of example 8, including or omitting optional elements, wherein the analysis circuitry is configured to determine a pre-distortion phase to be applied to the common reference signal by the pre-distortion circuitry by causing the pre-distortion circuitry to apply an initial pre-distortion phase to the common reference signal provided to the first modulator. Until a termination criteria is met, the analysis circuitry causes the first modulator to generate a next first modulated signal based on the pre-distorted common reference signal; causes the second modulator to generate a next second modulated signal based on the common reference signal; causes the analysis circuitry to determine a next first modulator phase error based on the next first modulated signal and the next second modulated signal; and iteratively reduce the pre-distortion phase applied by the pre-distortion circuitry by a predetermined portion of the next first modulator phase error.

Example 10 is a method for determining a phase error of a first modulator, including: providing a common reference signal to the first modulator to generate a first modulated signal; providing the reference signal to a second modulator to generate a second modulated signal; and determining a first modulator phase error based on the first modulated signal and the second modulated signal.

Example 11 includes the subject matter of example 10, including or omitting optional elements, further including: setting the phase of the first modulator to n different phase setting values and for each of the n phase setting values: determining a measured phase of the first modulator signal by combining the first modulated signal with the second modulated signal, while setting the phase of the second modulator to m different values; determining an nth incremental phase error as a difference between the measured phase and the nth phase setting value; combining the n incremental phase errors to generate a phase error; and reducing the phase error based on an estimated phase error contribution of the second modulator to determine the first modulator phase error.

Example 12 includes the subject matter of example 11, including or omitting optional elements, wherein m and n are greater than or equal to 8 and range from 0 to 360 degrees.

Example 13 includes the subject matter of example 11, including or omitting optional elements, further including: performing a k point Fast Fourier Transform on the phase error to generate a phase error harmonic analysis signal; determining a period component of the transformed signal; applying a first modulator contribution ratio to the period component to generate a first modulator phase error harmonic analysis; and performing a k point Inverse Fast Fourier Transform on the first modulator phase error harmonic analysis to generate the first modulator phase error.

Example 14 includes the subject matter of example 13, including or omitting optional elements, including generating the first modulator phase error harmonic analysis by: determining a 1-period component of the phase error harmonic analysis signal; applying a 1-period contribution ratio of approximately 1.0 to the 1-period component; determining a 2-period component of the phase error harmonic analysis signal; applying a 2-period contribution ratio of approximately 0.5 to the 2-period component; determining a 4-period component of the phase error harmonic analysis signal; and applying a 4-period contribution ratio of approximately 1.0 to the 4-period component.

Example 15 includes the subject matter of example 10, including or omitting optional elements, further including pre-distorting the common reference signal provided to the first modulator based on the first modulator phase error.

Example 16 includes the subject matter of example 15, including or omitting optional elements, further including determining a pre-distortion phase to be applied to the first signal by: applying an initial pre-distortion phase to the common reference signal provided to the first modulator and until a termination criteria is met: generating a next first modulated signal based on the pre-distorted common reference signal; generating a next second modulated signal based on the common reference signal; determining a next first modulator phase error based on the next first modulated signal and the next second modulated signal; and iteratively reducing the pre-distortion phase by a predetermined portion of the next first modulator phase error.

Example 17 is analysis circuitry, including measurement circuitry configured to generate a phase error by combining a first modulated signal with a second modulated signal, wherein the first modulated signal is a result of modulation of a reference signal by a first modulator and the second modulated signal is a result of modulation of the reference signal by a second modulator; and computation circuitry configured to determine a first modulator phase error based on the phase error.

Example 18 includes the subject matter of example 17, including or omitting optional elements, wherein the measurement circuitry includes a mixer configured to combine the first modulated signal with the second modulated signal to generate a measured phase signal.

Example 19 includes the subject matter of example 18, including or omitting optional elements, wherein the mixer includes a down-conversion mixer associated with a receive chain.

Example 20 includes the subject matter of example 17, including or omitting optional elements, further including: modulator control circuitry configured to set the phase of the first modulator to n different phase setting values while, for each of the n phase setting values setting the phase of the second modulator to m different phase setting values; and computation circuitry. The computation circuitry is configured to, for each of the n phase setting values: determine a measured phase of the first modulator signal by combining the first modulated signal with the second modulated signal; determine an nth incremental phase errors as a difference between the measured phase and the nth phase setting value; and combine the n incremental phase errors to generate a phase error; and reduce the phase error based on an estimated phase error contribution of the second modulator to determine the first modulator phase error.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. The various illustrative logics, logical blocks, modules, and circuits described in connection with aspects disclosed herein can be implemented or performed with a general purpose processor executing instructions stored in computer readable medium.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. The use of the phrase "one or more of A, B, or C" is intended to include all combinations of A, B, and C, for example A, A and B, A and B and C, B, and so on.

What is claimed is:

1. An integrated circuit device comprising:
   a first modulator configured to modulate a first signal to generate a first modulated signal;
   a second modulator configured to modulate a second signal to generate a second modulated signal;
   wherein the first signal and the second signal are based on a common reference signal; and
   analysis circuitry configured to determine a phase error of the first modulator based on a phase of a combination of the first modulated signal and the second modulated signal.

2. The integrated circuit device of claim 1, wherein the analysis circuitry comprises measurement circuitry comprising a mixer configured to combine the first modulated signal and the second modulated signal to generate a measured phase signal.

3. The integrated circuit device of claim 2, wherein the measurement circuitry comprises a down-conversion mixer and an analog-to-digital converter associated with a receive chain.

4. The integrated circuit device of claim 1, wherein the common reference signal comprises a continuous wave test signal.

5. The integrated circuit device of claim 1, wherein the analysis circuitry comprises:
   modulator control circuitry configured to set a phase of the first modulator to n different phase setting values while, for each of the n different phase setting values, setting a phase of the second modulator to m different phase setting values; and
   computation circuitry configured to:
      for each of the n different phase setting values:
         determine a measured phase of the first modulator signal by combining the first modulated signal with the second modulated signal; and
         determine an nth incremental phase error as a difference between the measured phase and an nth phase setting value;
      combine the n incremental phase errors to generate a phase error; and
      reduce the phase error based on an estimated phase error contribution of the second modulator to determine the phase error of the first modulator.

6. The integrated circuit device of claim 5, wherein the computation circuitry is configured to:
   perform a k point Fast Fourier Transform on the phase error to generate a harmonic analysis of the phase error;
   determine a period component of the harmonic analysis of the phase error;
   apply a contribution ratio to the period component to generate a phase error harmonic analysis of the phase error of the first modulator; and
   perform a k point Inverse Fast Fourier Transform on the phase error harmonic analysis of the phase error of the first modulator to generate the phase error of the first modulator.

7. The integrated circuit device of claim 6, wherein the computation circuitry is configured to generate the phase error harmonic analysis of the phase error of the first modulator by:
   determining a 1-period component of the harmonic analysis of the phase error;
   applying a 1-period contribution ratio of approximately 1.0 to the 1-period component;
   determining a 2-period component of the phase error harmonic analysis;
   applying a 2-period contribution ratio of approximately 0.5 to the 2-period component;
   determining a 4-period component of the phase error harmonic analysis; and
   applying a 4-period contribution ratio of approximately 1.0 to the 4-period component.

8. The integrated circuit device of claim 1, further comprising pre-distortion circuitry configured to pre-distort the common reference signal provided to the first modulator based on the phase error of the first modulator.

9. The integrated circuit device of claim 8, wherein the analysis circuitry is configured to determine a pre-distortion phase to be applied to the common reference signal by the pre-distortion circuitry by:
   causing the pre-distortion circuitry to apply an initial pre-distortion phase to the common reference signal provided to the first modulator;

until a termination criteria is met:
  causing the first modulator to generate a next first modulated signal based on the pre-distorted common reference signal;
  causing the second modulator to generate a next second modulated signal based on the common reference signal;
  causing the analysis circuitry to determine a next phase error of the first modulator based on the next first modulated signal and the next second modulated signal; and
  iteratively reducing the pre-distortion phase applied by the pre-distortion circuitry by a predetermined portion of the next phase error of the first modulator.

10. A method for determining a phase error of a first modulator, comprising:
  providing a common reference signal to the first modulator to generate a first modulated signal;
  providing the common reference signal to a second modulator to generate a second modulated signal; and
  determining the phase error of the first modulator based on a phase of a combination of the first modulated signal and the second modulated signal.

11. The method of claim 10, further comprising:
  setting a phase of the first modulator to n different phase setting values;
  for each of the n different phase setting values:
    determining a measured phase of the first modulator signal by combining the first modulated signal with the second modulated signal, while setting a phase of the second modulator to m different values;
    determining an nth incremental phase error as a difference between the measured phase and an nth phase setting value;
  combining the n incremental phase errors to generate a phase error; and
  reducing the phase error based on an estimated phase error contribution of the second modulator to determine the phase error of the first modulator.

12. The method of claim 11, wherein m and n are greater than or equal to 8 and range from 0 to 360 degrees.

13. The method of claim 11, further comprising:
  performing a k point Fast Fourier Transform on the phase error to generate a phase error harmonic analysis signal;
  determining a period component of the transformed phase error harmonic analysis signal;
  applying a first modulator contribution ratio to the period component to generate a harmonic analysis of the phase error of the first modulator; and
  performing a k point Inverse Fast Fourier Transform on the harmonic analysis of the phase error of the first modulator to generate the phase error of the first modulator.

14. The method of claim 13, comprising generating the harmonic analysis of the phase error of the first modulator by:
  determining a 1-period component of the phase error harmonic analysis signal;
  applying a 1-period contribution ratio of approximately 1.0 to the 1-period component;
  determining a 2-period component of the phase error harmonic analysis signal;
  applying a 2-period contribution ratio of approximately 0.5 to the 2-period component;
  determining a 4-period component of the phase error harmonic analysis signal; and
  applying a 4-period contribution ratio of approximately 1.0 to the 4-period component.

15. The method of claim 10, further comprising pre-distorting the common reference signal provided to the first modulator based on the phase error of the first modulator.

16. The method of claim 15, further comprising determining a pre-distortion phase to be applied to the first signal by:
  applying an initial pre-distortion phase to the common reference signal provided to the first modulator;
  until a termination criteria is met:
    generating a next first modulated signal based on the pre-distorted common reference signal;
    generating a next second modulated signal based on the common reference signal;
    determining a next phase error of the first modulator based on the next first modulated signal and the next second modulated signal; and
    iteratively reducing the pre-distortion phase by a predetermined portion of the next phase error of the first modulator.

17. Analysis circuitry, comprising:
  measurement circuitry configured to generate a phase error by combining a first modulated signal with a second modulated signal, wherein the first modulated signal is a result of modulation of a common reference signal by a first modulator and the second modulated signal is a result of modulation of the common reference signal by a second modulator; and
  computation circuitry configured to determine a phase error of the first modulator based on the phase error of the combination of the first modulated signal and the second modulated signal.

18. The analysis circuitry of claim 17, wherein the measurement circuitry comprises a mixer configured to combine the first modulated signal with the second modulated signal to generate a measured phase signal.

19. The analysis circuitry of claim 18, wherein the mixer comprises a down-conversion mixer associated with a receive chain.

20. The analysis circuitry of claim 17, further comprising:
  modulator control circuitry configured to set a phase of the first modulator to n different phase setting values while, for each of the n different phase setting values, setting a phase of the second modulator to m different phase setting values; and
  computation circuitry configured to:
    for each of the n phase different setting values:
      determine a measured phase of the first modulator signal by combining the first modulated signal with the second modulated signal;
      determine an nth incremental phase error as a difference between the measured phase and an nth phase setting value; and
    combine the n incremental phase errors to generate a phase error; and
    reduce the phase error based on an estimated phase error contribution of the second modulator to determine the phase error of the first modulator.

* * * * *